US008006185B2

(12) United States Patent  
Marinkovich et al.

(10) Patent No.: US 8,006,185 B2
(45) Date of Patent: Aug. 23, 2011

(54) THREE DIMENSIONAL VIEWER FOR VIDEO

(75) Inventors: Mike Marinkovich, Santa Clara, CA (US); Greg Lindley, Sunnyvale, CA (US); Alan Cannistraro, San Francisco, CA (US); Evan Doll, San Francisco, CA (US); Gary Johnson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 500 days.

(21) Appl. No.: 11/760,719

(22) Filed: Jun. 8, 2007

(65) Prior Publication Data

US 2008/0307309 A1 Dec. 11, 2008

(51) Int. Cl.
*G06F 3/00* (2006.01)
*G06F 3/048* (2006.01)

(52) U.S. Cl. ......... 715/723; 715/720; 715/757; 715/850

(58) Field of Classification Search .................. 715/720, 715/723, 732, 757, 782, 834, 848, 850
See application file for complete search history.

(56) References Cited

U.S. PATENT DOCUMENTS

| | | | | |
|---|---|---|---|---|
| 6,002,403 A | * | 12/1999 | Sugiyama et al. | 715/717 |
| 6,466,237 B1 | * | 10/2002 | Miyao et al. | 715/838 |
| 6,573,907 B1 | * | 6/2003 | Madrane | 715/719 |
| 7,065,710 B2 | * | 6/2006 | Hayashi et al. | 715/732 |
| 7,296,242 B2 | * | 11/2007 | Agata et al. | 715/793 |
| 7,350,158 B2 | * | 3/2008 | Yamaguchi et al. | 715/834 |
| 7,383,503 B2 | * | 6/2008 | Banks | 715/273 |
| 7,725,837 B2 | * | 5/2010 | Wong et al. | 715/815 |
| 2004/0150657 A1 | * | 8/2004 | Wittenburg et al. | 345/619 |
| 2005/0091596 A1 | * | 4/2005 | Anthony et al. | 715/712 |
| 2005/0138569 A1 | * | 6/2005 | Baxter et al. | 715/788 |
| 2005/0210416 A1 | * | 9/2005 | MacLaurin et al. | 715/851 |
| 2006/0048076 A1 | * | 3/2006 | Vronay et al. | 715/850 |
| 2006/0109283 A1 | * | 5/2006 | Shipman et al. | 345/629 |
| 2007/0067738 A1 | * | 3/2007 | Flynt et al. | 715/810 |
| 2008/0307303 A1 | * | 12/2008 | Louch et al. | 715/273 |

OTHER PUBLICATIONS

Knut Manske, Video browsing using 3D video content trees, Proceedings of the 1998 workshop on New paradigms in information visualization and manipulation, p. 20-24, Nov. 2-7, 1998.*
K. Manske, M. Muhlhauser, S. Vogl, M. Goldberg, OBVI: Hierarchical 3D video-browsing, Proceedings of the Sixth ACM Multimedia Conference, Bristol, UK, Sep. 1998.*
Andrew Coulter Enright "The fliptych interface" the treehouse + the cave Aug. 6, 2006 2 pages.*
Apple iTunes 7 CNET editors' review Sep. 15, 2006 6 pages.*

* cited by examiner

*Primary Examiner* — Adam M Queler
*Assistant Examiner* — Andrea N Long
(74) *Attorney, Agent, or Firm* — Fisher & Richardson P.C.

(57) ABSTRACT

A computer-implemented method of presenting digital content can include displaying several arranged in a staggered formation in a user interface, wherein at least one of the several panes is entirely visible and adjacent panes are partially visible and displayed adjacent to the entirely visible pane, displaying a frame of an item of digital content comprising a sequence of frames in an entirely visible pane and displaying adjacent frames in corresponding adjacent panes, and displaying in the entirely visible pane successive frames of the digital content item by sequentially replacing the frame in the entirely visible pane with an adjacent frame.

31 Claims, 4 Drawing Sheets

THREE DIMENSIONAL VIEWER FOR VIDEO

TECHNICAL FIELD

This disclosure relates to viewing digital content, e.g., digital video or images.

BACKGROUND

Scenes in motion can be captured and recorded using a variety of devices ranging from state-of-the-art professional video cameras used in television and movie-making to simple cameras on cellular telephones. Some of the devices that can be used to capture motion pictures, including digital camcorders and digital cameras, allow storing the captured images in digital format including the moving picture experts group. (MPEG) format. Depending on device capabilities and user settings, a camera can capture and store both audio and video. The recorded information is automatically stored in digital format and can be easily transported to secondary devices, including a hard disk of a computer, using various wired or wireless communications protocols such as bluetooth or universal serial bus (USB).

Video editing software, such as iMovie HD 6.0.1, enables users to view and perform non-linear editing onto raw footage. Such editing may include cutting segments of the footage, re-arranging segments of the same video clip, re-arranging and combining segments of multiple video clips, and/or modifying the captured content by adding or substituting other content including audio tracks, voice-overs, titles, and transitions between frames.

SUMMARY

In one example, digital content, e.g., digital video stored as a sequence of frames, is displayed in a user interface across several staggered panes. Each pane can display the content of one frame in the sequence. When the digital content is played, a first frame displayed in a first pane can be replaced by a subsequent frame in the sequence and the first frame can be displayed in a pane adjacent to the first pane. One of the panes can be displayed more prominently on the user interface in comparison to other panes. The arrangement of panes in combination with the updating of frames displayed in the panes can present the viewer with a three-dimensional (3D) viewing experience.

In one aspect, a computer implemented method of presenting digital content is described. The method includes displaying a plurality of panes arranged in a staggered formation in a user interface, wherein at least one pane of the plurality of panes is entirely visible and adjacent panes are partially visible and displayed adjacent to the at least one entirely visible pane, displaying a frame of an item of digital content comprising a sequence of frames in an entirely visible pane and displaying adjacent frames in corresponding adjacent panes, and displaying in the entirely visible pane successive frames of the item of digital content by sequentially replacing the frame in the entirely visible pane with the adjacent frame.

This, and other aspects, can include one or more of the following features. The sequence of frames can correspond to digital video. Sequentially replacing the frame in the entirely visible pane with an adjacent frame can cause the replaced frame to be displayed in a partially visible adjacent pane. The sequentially replacing can be stopped or started based on user input. Displaying the replaced frame in a partially visible adjacent pane to the right of the entirely visible pane corresponds to displaying the item of digital content in a forward direction. The direction in which the item of digital content is displayed can be altered based on user input. The pane can be rectangular. One or more of the remaining panes can be displayed on the user interface to the left of the at least one entirely visible pane. A top edge and a left edge of each of the one or more of the remaining panes displayed to the left of the at least one entirely visible pane can be visible. One or more of the remaining panes can be displayed on the user interface to the right of the at least one entirely visible pane. A top edge and a right edge of each of the one or more of the remaining panes displayed to the right of the at least one entirely visible pane can be visible. The method can further include continuously performing the displaying in the entirely visible pane successive frames of the item of digital content by sequentially replacing the frame in the entirely visible pane at the adjacent frame at a rate. The rate can be a rate at which the frames in the sequence are encoded. The method can further include selecting a frame displayed in a pane in the plurality of panes, and moving the selected frame to a new pane in the plurality of panes. Moving the selected frame to the new pane can cause the remaining frames displayed in the remaining panes to be repositioned to maintain the sequence of frames. The method can further include displaying a second plurality of panes adjacent to the plurality of panes, the second plurality of panes arranged in a staggered formation on the user interface wherein a pane of the second plurality of panes is entirely visible and remaining panes of the second plurality of panes, displayed adjacent to the first pane, are partially visible, selecting a frame displayed in a pane in the plurality of panes, and moving the selected frame to a pane in the second plurality of panes. The method can further include detecting the selection of the partially visible adjacent pane, and in response to the detecting, displaying a new entirely visible adjacent pane, and displaying a frame in the displayed partially visible adjacent pane in the new entirely visible adjacent pane.

In another aspect, a medium bearing instructions to enable one or more machines to perform operations is described. The operations can include displaying a plurality of panes arranged in a staggered formation in a user interface, wherein at least one pane of the plurality of panes is entirely visible and adjacent panes are partially visible and displayed adjacent to the at least one entirely visible pane, displaying a frame of an item of digital content comprising a sequence of frames in an entirely visible pane and displaying adjacent frames in corresponding adjacent panes, and displaying in the entirely visible pane successive frames of the item of digital content by sequentially replacing the frame in the entirely visible pane with the adjacent frame.

This, and other aspects, can include one or more of the following features. The sequence of frames can correspond to digital video. Sequentially replacing the frame in the entirely visible pane with an adjacent frame can cause the replaced frame to be displayed in a partially visible adjacent pane. The sequentially replacing can be stopped or started based on user input. Displaying the replaced frame in a partially visible adjacent pane to the right of the entirely visible pane corresponds to displaying the item of digital content in a forward direction. The direction in which the item of digital content is displayed can be altered based on user input. The pane can be rectangular. One or more of the remaining panes can be displayed on the user interface to the left of the at least one entirely visible pane. A top edge and a left edge of each of the one or more of the remaining panes displayed to the left of the at least one entirely visible pane can be visible. One or more of the remaining panes can be displayed on the user interface to the right of the at least one entirely visible pane. A top edge and a right edge of each of the one or more of the remaining panes displayed to the right of the at least one entirely visible pane can be visible. The operations can further include continuously performing the displaying in the entirely visible pane successive frames of the item of digital content by sequentially replacing the frame in the entirely visible pane at the adjacent frame at a rate. The rate can be a rate at which the frames in the sequence are encoded. The operations can further include selecting a frame displayed in a pane in the plurality of panes, and moving the selected frame to a new pane in the plurality of panes. Moving the selected frame to the new pane can cause the remaining frames displayed in the remaining panes to be repositioned to maintain the sequence of frames. The operations can further include displaying a second plurality of panes adjacent to the plurality of panes, the second plurality of panes arranged in a staggered formation on the user interface wherein a pane of the second plurality of panes is entirely visible and remaining panes of the second plurality of panes, displayed adjacent to the first pane, are partially visible, selecting a frame displayed in a pane in the plurality of panes, and moving the selected frame to a pane in the second plurality of panes. The operations can further include detecting the selection of the partially visible adjacent pane, and in response to the detecting, displaying a new entirely visible adjacent pane, and displaying a frame in the displayed partially visible adjacent pane in the new entirely visible adjacent pane.

The systems and techniques described here can present one or more of the following advantages. User experience during viewing and editing digital content can be enhanced. The staggered display of frames can enable a user to identify groups of frames that share a common background as well as scene breaks in video without viewing each frame in the group or the sequence. Further, the staggered display of frames can provide the user with contextual information related to a frame since the user can partially see the frames before and after the entirely visible frame. In addition, the user can access a frame of interest based on the staggered display without requiring knowledge of the exact location of a frame in a sequence. Also, displaying one or more of the partially visible frames in their entirety can assist editing operations. These features can make the software simple for an average user to operate, while providing a near-professional quality to the finished video.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
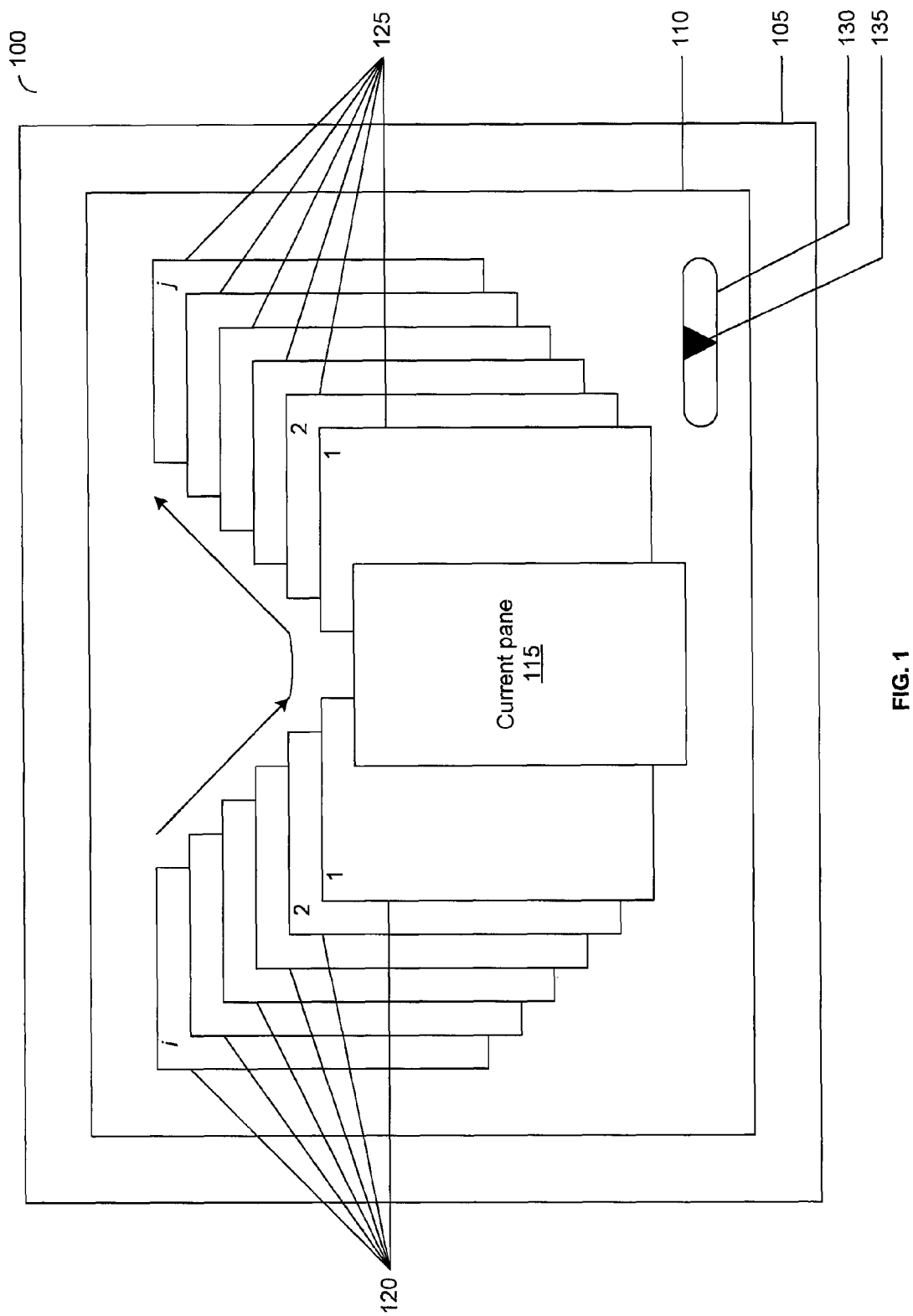
FIG. 1 is a schematic of an example of a user interface displaying a staggered collection of panes.

FIG. 1 depicts a schematic of an example of a display device 105 of a system 100 including a user interface (UI) 110 displaying a staggered collection of panes. The UI 110 can be presented by software, e.g., viewing and/or editing software, installed on the system 100 that the user can employ to view and edit the digital content. One or more frames of a sequence of frames, representing digital content, can be displayed on one or more of the staggered collection of panes, where the panes can be rectangular in shape. In some implementations, the sequence of frames representing digital content, e.g., digital video can be recorded using a recording instrument, e.g., video camcorder, digital camera, cellular telephone, and the like. Alternatively, the sequence of frames can represent live or recorded streaming video. The staggered panes can include a current pane 115, one or more future panes 120, and one or more past panes 125. The current pane 115 can be displayed in its entirety on the UI 110. In some implementations, the first future pane 120 can be positioned to the left of the current pane 115 and partially hidden from view, such that at least a portion of the future pane 120, including the top and the left edges of the future pane, are visible on the UI 110. Such arrangement can provide a display where the first future pane 120 appears to be partially hidden behind the current pane 115. Similarly, each future pane 120 can be positioned behind another future pane 120 on the UI 110 to provide a display where the future panes 120 appear to be arranged in a staggered 3D collection where the ith future pane 120 is at the bottom of the collection and the current pane 115 is at the top of the collection. In a similar manner, the past panes 125 can be positioned to the right of the current pane 115 and partially hidden from view, such that at least a portion of the past pane 125, including the top and the right edges of the past pane, are visible on the UI 110. Thus, the past panes 125 can be positioned in a manner similar to that of the future panes 120, but to the right of the current pane 115 to provide a display where the past panes 125 appear to be arranged in a staggered 3D collection where the jth past pane 125 is at the bottom of the collection and the current pane 115 is at the top of the collection.

Each pane displayed in the UI 110 can display the contents of one frame in the sequence. Only the frames displayed on the fully visible panes, e.g., the current pane 115, can be seen in their entirety, while only portions of the frames displayed on the partially hidden panes can be seen on the UI 110. For example, a first future pane 120 can be partially hidden behind the current pane 115, such that the top edge and the left edge of the future pane 120 are visible, while the remainder of the future pane 120 is partially hidden. When a frame is displayed on this partially hidden future pane 120, only the region of the frame that occupies the visible portion of the partially hidden future pane 120 can be seen on the display device 105. When viewed, a current frame displayed on a first pane can be replaced by a subsequent frame in the sequence, e.g., the next frame in the sequence, while the current frame can be displayed in a pane adjacent to the first pane at a predetermined rate, such as the frame rate, e.g., 60 frames per second. Due to the arrangement of panes on the UI 110, when the sequence is played, a frame in the sequence can be displayed in each of the staggered future panes 120, then in the current pane 115, then in each of the staggered past panes 125, and can eventually be removed from the UI 110. The updated displaying of frames on the staggered panes can provide the user a 3D viewing experience where each frame can appear in the background near the left edge of the UI 110, move towards the foreground near the center of the UI 110, move towards the background near the right edge of the UI 110 and, eventually, disappear. While the current pane 115 can display a frame of interest, frames displayed in the future panes 120 and past panes 125 can be the frames that follow and precede, respectively, the frame of interest in the sequence.

In some implementations, the UI 110 can include i future panes 120 and j past panes 125, and the number of panes displayed on the UI 110 can be fixed. When the sequence of frames representing the video is uploaded into the UI 110, the panes on the UI 110 can display the frames in the sequence, such that the first frame in the sequence is displayed in the current pane 115, each subsequent frame in the sequence is displayed in a corresponding future pane 120, and the past panes 125 are blank. In implementations where the digital content is digital video, when video playback commences, each subsequent frame in the sequence can be advanced to the next pane on the UI 110, e.g., from left to right. For example, the first frame in the sequence can be moved to the first past pane 125, the second frame in the sequence can be moved to the current pane 115, the frame on the second future pane 120 can be moved to the first future pane 120, and so on. When playback ends, the last frame in the sequence can be displayed in the current pane 115, the frames preceding the last frame can each be displayed in a corresponding past pane 125 and the future panes 120 can be blank. Alternatively, all panes on the UI 110 can initially be blank. When playback commences, the first frame in the sequence can be displayed in the ith future pane 120. Subsequently, the first frame can be moved to the (i−1)th future pane 120, the second frame can be displayed in the ith future pane 120, and so on. In this manner, the first frame of the sequence can be displayed first in the future pane 120, then in the current pane 115, and, then in the past pane 125. When playback ends, the jth past pane 125 can display the last frame of the sequence while the remaining panes can be blank. Alternatively, when playback ends, all panes on the UI 110 can be blank.

In implementations where the number of panes on the UI 110 is fixed and is less than the number of frames in the sequence, only a portion of the sequence of frames can be displayed in the panes on the UI 110 at a given time instant. For example, the staggered collection can include 51 panes (25 future panes, 1 current pane, 25 past panes), while the video can include a sequence of 200 frames. During playback, at any instant, 51 successive frames of the 200 frames can be displayed in the panes in the UI 110. When the 1$^{st}$ frame of the sequence is displayed on the jth past pane 125 in the background, the 51$^{st}$ frame in the sequence can be displayed on the ith future pane 120 in the background. When the display is updated, the 1$^{st}$ frame can disappear from the UI 110, each frame on the UI 110 can be moved to the pane on the right, and the 52$^{nd}$ frame can appear in the ith future pane 120 in the background. In this manner, successive frames equal in number to the number of panes on the UI 110 can be displayed at any time instant.

Alternatively, the frames displayed in the panes can be spaced such that the frames displayed in the background, e.g., at and near the ith future pane 120, and at and near the jth past pane 125, do not display successive frames, while the frames displayed in the foreground, e.g., at and near the 1$^{st}$ future pane 120, the current pane 115, and at and near the 1$^{st}$ past pane 125, display successive frames. For example, a sequence can include 200 frames and the staggered collection can include 51 panes (25 future panes, 1 current pane, 25 past panes). The frames displayed in past panes j, (j−1), and (j−2) can be frames 1, 11, and 21, respectively. The frames displayed in the 2$^{nd}$ and 1$^{st}$ past panes 125, the current pane 115, and the 1$^{st}$ and 2$^{nd}$ future panes 120 can be frames 31, 32, 33, 34, and 35, respectively. The frames displayed in future panes (i−2), (i−1), and i can be frames 41, 51, and 61, respectively. In this manner, the frames displayed on the panes can be spaced to display more frames than the number of panes on the UI 110. In some implementations, the display of a pane can be fixed. For example, the ith future pane 120 can always display the last frame in the sequence. Similarly, the jth past pane 125 can initially be blank and, once the updating causes the 1$^{st}$ frame to be displayed on the jth past pane 125, the jth past pane can always display the 1$^{st}$ frame. In some implementations, the number of panes displayed on the UI 110 can be less than the number of frames in the sequence. In such implementations, when the sequence is played on the UI 110, one or more panes on the UI 110 can be blank at any instant. In some implementations, the depth between frames, the spacing between spaces, and both, in addition to the geometric layout can be dynamically adjusted based on algorithms including logarithmic algorithms, segmented, linear algorithms, or combinations of algorithms.

In some implementations, when the video is played on the UI 110 using the software, the rate at which the display of frames on the panes is updated can equal the frame rate at which the sequence was encoded, e.g., 60 frames per second. The rate at which the display of frames on the panes is updated can be changed based on user input. In some implementations, the software can be configured to provide update rates, e.g., 2× (twice the encoded frame rate), 0.5× (half the encoded frame rate), and the like. A user can select an update rate from one of the pre-determined choices. In such implementations, the user can first select the update rate and the sequence can be played back on the UI 110 at the selected update rate. In other implementations, the software can be configured to provide a variable update rate. For example, a slider 130 can be included in the UI 110 with a pointer 135 that can be moved by a user, e.g., using a pointing device such as a mouse. When the pointer 135 is positioned at the center of the slider 130, the update rate can equal the encoded frame rate. When the pointer 135 is moved to the right of the center, the update rate can be increased. Similarly, when the pointer 135 is moved to the left of the center, the update rate can be decreased. In some implementations, the user can use the key board to update the display on the UI 110, one frame at a time. For example, the user can upload the sequence of frames into the UI 110 and press the right arrow key. Every time the right arrow key is pressed, a pane displaying a frame of the sequence on the UI 110 can be updated with the next frame in the sequence. In this manner, the user can be playback the video at different speeds.

In some implementations, a user can select and move a frame that is displayed in either the future pane 120 or the past pane 125 to the current pane 115, e.g., using a pointing device such as a mouse. When a frame is moved from a future pane 120 or a past pane 125 to the current pane 115, the remaining frames in the UI 110 can be automatically re-positioned so that the frames remain in the sequence in which they were recorded. Similarly, a frame in the current pane 115 can be selected, moved, and placed in any future pane 120 or past pane 125 causing the remaining frames to be re-positioned to maintain the sequence. In this manner, any frame in the sequence can be positioned in the foreground by placing the frame in the current pane 115. Similarly, any frame in the sequence can be positioned in the background by placing the frame either in the future pane 120 or the past pane 125.

Figure 2:
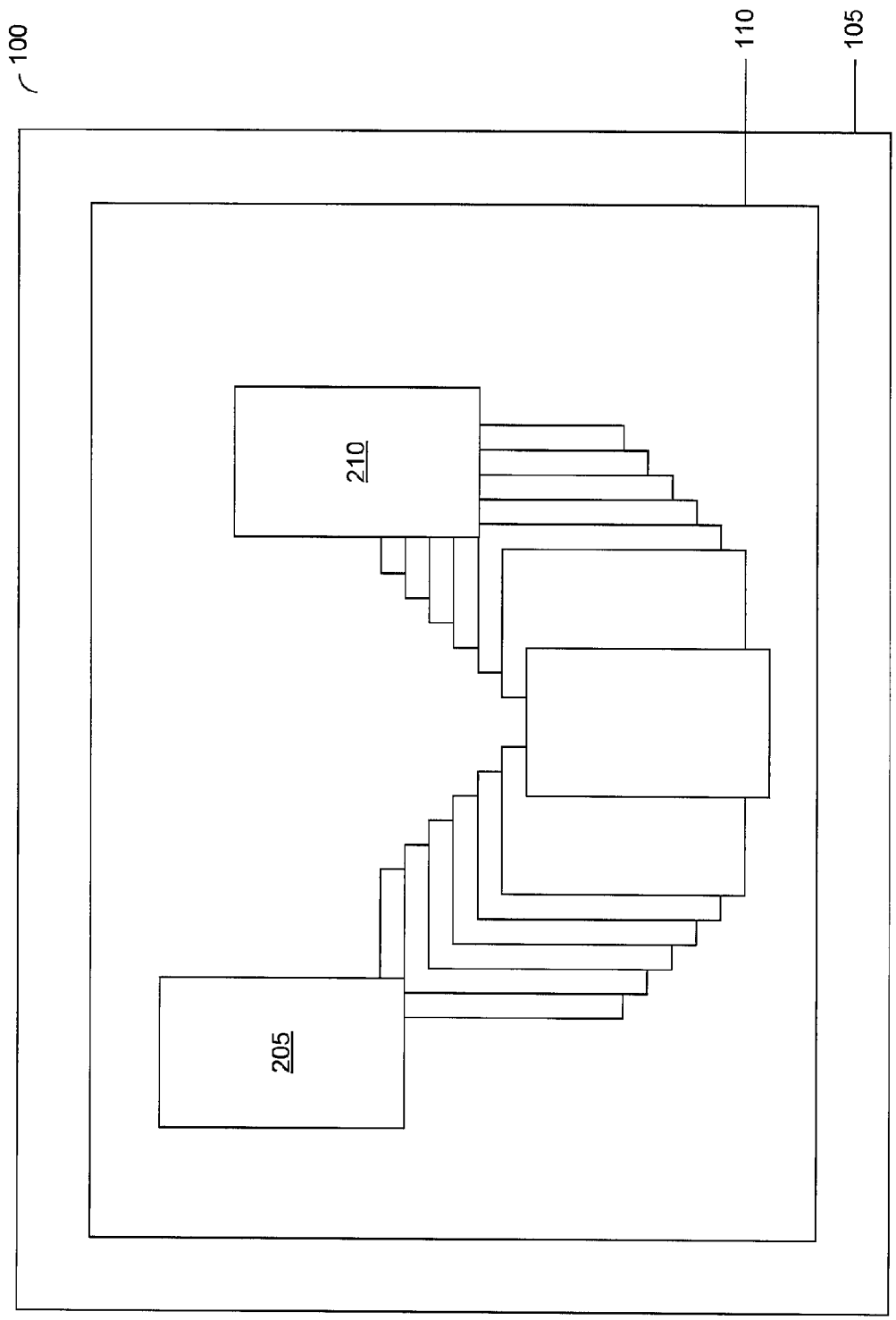
FIG. 2 is a schematic of an example of a user interface displaying a staggered collection of panes.

FIG. 2 is a schematic of an example of a UI 110 displaying a future pane 205 and a past pane 210 in their entirety. In some implementations, the user can select a future pane 120 and/or a past pane 125, that is only partially displayed, to be fully displayed in the UI 110. When the future pane 120 is selected for full display, a new pane 205 can be displayed on the UI 110, and the frame displayed in the selected future pane 120 can also be displayed in the new pane 205. Similarly, when a past pane 125 is selected for full display, a new pane 210 can be displayed on the UI 110, and the frame displayed in the selected past pane 125 can also be displayed in the new pane 210. When the sequence of frames is played on the UI 110, the frame displayed in the partially hidden future pane 120 and that displayed in the partially hidden past pane 125 can be updated. In addition, the frame displayed in pane 205 and pane 210 can also be updated to match the frame displayed in the corresponding future pane 120 and past pane 125, respectively. Alternatively, when a future pane 120 that is partially hidden is selected to be displayed in its entirety, the software can be configured to move the selected future pane 120 from the staggered collection of future panes 120 and position the pane in a region of the UI 110 where the pane is displayed in its entirety. Similarly, the past pane 125 can also be moved from the staggered collection of past panes 125 and displayed in its entirety in a region of the UI 110.

In some implementations, the panes on the UI 110, including the current pane 115, the future panes 120, and the past panes 125, can be automatically re-sized to accommodate one or more new panes, e.g., pane 205 and 210, within the dimensions of the UI 110 on the display device 105. For example, a user can select a future pane 120 to be displayed in its entirety on the UI 110, and the selected future pane 120 can be displayed near the top left corner of the UI 110. In response to a user selecting a future pane 120, the panes on the UI 110 can be decreased in size, moved towards the right edge of the UI 110, or both, to accommodate the selected future pane 120. In some implementations, all the panes on the UI 110, including the current pane 115, the future panes 120, and the past panes 125, can be simultaneously re-positioned such that the collection of panes appears to be rotated about an axis passing vertically through and parallel to the plane of the current frame 115. In other implementations, a user can re-position all the panes on the UI 110 to provide an appearance of rotation about any axis parallel to the plane of the current frame 115. In this manner, the orientation of the collection of panes on the UI 110 can be altered based on pre-determined positions, user-defined positions, or both.

Figure 3:
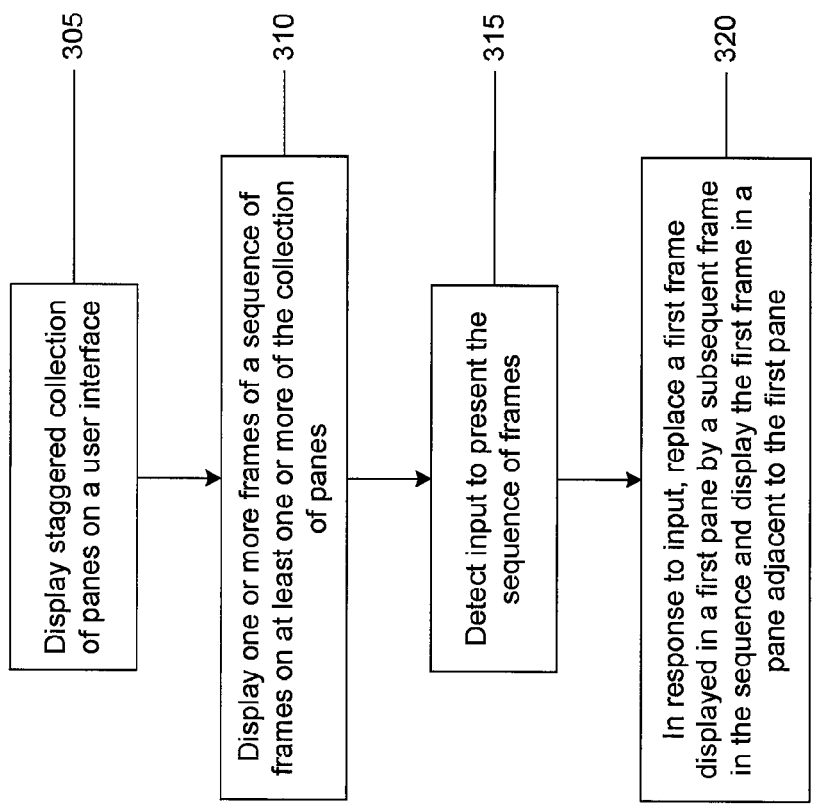
FIG. 3 is a flow chart of an example of a process for displaying digital content across a staggered collection of panes.

FIG. 3 depicts a flow chart of an example of a process for displaying a sequence of frames on a staggered collection of panes on a user interface. A staggered collection of panes can be displayed on a user interface at 305. The staggered collection can represent one or more future panes, a current pane, and one or more past panes. The collection of panes can be displayed such that, in a default implementation, the current pane is positioned near the center of the user interface and is visible in its entirety. The first future pane can be positioned to the left of the current pane, such that the top and left edges of the first future pane are visible while the remainder of the first future pane appears hidden behind the current pane. Each remaining future pane can be arranged in a similar manner adjacent to a corresponding future pane. Similarly, the first past pane can be positioned to the right of the current pane, such that the top and right edges of the first past pane are visible while the remainder of the first past pane appears hidden behind the current pane. Each remaining current pane can be arranged in a similar manner. In the default implementation, arrangement of panes can provide a 3D appearance where the future panes are staggered from top to bottom and from left to the right, the current pane is visible in its entirety, and the past panes are staggered from right to left and from bottom to top. In other implementations, the arrangement of the staggered collection of panes can be altered. For example, the past panes can be positioned to the left and the future panes can be positioned to the right of the current pane to match the conventional direction of a time line going from left to right. The future panes can be staggered from bottom to the top and the past panes can be staggered from the top to the bottom. Alternatively, or in addition, any combination of staggered display can be used, where the staggered display can be either predetermined, defined by a user, or both. The number of panes displayed in the staggered collection can be fixed or varied based on user input.

One or more frames of a sequence of frames can be displayed on at least one or more of the collection of panes at 310. The sequence of frames can be related to a video recorded using a recording instrument, streaming video (recorded and/or live), and the like. When the sequence of frames is uploaded into the user interface, one or more frames can be displayed on one or more panes. For example, the first frame of the sequence can be displayed on the current pane, the second frame in the sequence can be displayed on the first future pane adjacent to the current pane, the third frame in the sequence can be displayed on the second future pane adjacent to the first future pane, and so on, while the past panes can be blank. Alternatively, the first frame of the sequence can be displayed on the first future pane, while the remaining frames in the sequence can be blank. In some implementations, the last future pane near the top left edge of the user interface can display the last frame in the sequence, the current pane can display the first frame in the sequence, some or all of the remaining frames in the sequence can be displayed in the future panes between the current pane and the last future pane, and the past panes can be blank. In some implementations, the last frame in the sequence can be displayed in the current pane, the first frame in the sequence can be displayed in the past pane adjacent to the top right edge of the user interface, and one or more of the remaining frames can be displayed in the past panes in between, while the future panes can be blank. In this manner, virtually any number of frames in the sequence can be displayed in virtually any number of panes on the user interface, so long as the sequence in which the frames are recorded is unaltered.

An input to detect the sequence of frames can be received at 315. In some implementations, when the software presenting the user interface is launched on a system, the software can be configured to scan one or more storage devices, operatively coupled to the system, for sequences of frames, e.g., video files, upload one of the sequences of frames, and display one or more of the frames in one or more of the panes on the user interface. In other implementations, the input to display one or more frames of a sequence of frames on one or more panes on the user interface can be received from a user. In some implementations, presenting the sequence of frames can be playing back the video file. Once the video file is loaded into the user interface and displayed on one or more panes, a user can click on a "Play" button on the user interface configured to commence play back at a predetermined frame rate.

Upon detecting an input to present the sequence of frames, a first frame displayed in a first pane can be replaced by a subsequent frame in the sequence and the first frame can be displayed in a pane adjacent to the first pane at 320. For example, the first frame of the sequence can be displayed in the current pane, the second frame of the sequence can be displayed in the first future pane adjacent to the current pane, the third frame of the sequence can be displayed in the second future pane adjacent to the first future pane, and so on, while the past panes can be blank. When an input to present the sequence is detected, the frame in the current pane can be replaced with the second frame in the sequence and the first frame can be displayed in the first past pane adjacent to the current pane. In this manner, the display of frames in the panes can be updated. Based on user input, the updating can be continuous, i.e., after the first input, updating can occur continuously, or an input may be required after each update. In a continuous update, the frames can be updated at the encoded frame rate, e.g., 60 frames per second, and the sequence of frames, representing the video file, can be viewed on the user interface. In addition, the user can alter the frame rate to view the digital content at a faster or slower rate than the encoded frame rate. Alternatively, the updating of the display of frames can be stopped and/or paused after each input. For example, the frames can be updated in the panes in the user interface at the rate of one frame per input. In this example, for every input, e.g., the click of a mouse, the frame displayed in the current pane can be displayed either in the immediately adjacent first future pane or first past pane, based on user input. In another example, the frames can be updated in the panes in the user interface at a frame rate chosen by a user. For example, the user can set an update rate of 5 frames per input. In this example, for every input, the frame displayed in the current pane can be advanced by 5 frames. Thus, if the $1^{st}$ frame is displayed in the current pane, when an input is received, the $6^{th}$ frame can be displayed in the current pane, and the $1^{st}$ frame can be displayed in the first past pane adjacent to the current pane. In this manner, the user can step through the sequence of frames either one frame at a time or a desired number of frames at a time. In some implementations, the user interface can include a slider with a pointer that enables a user to choose a number of frames updated per input.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, near-touch input, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Figure 4:
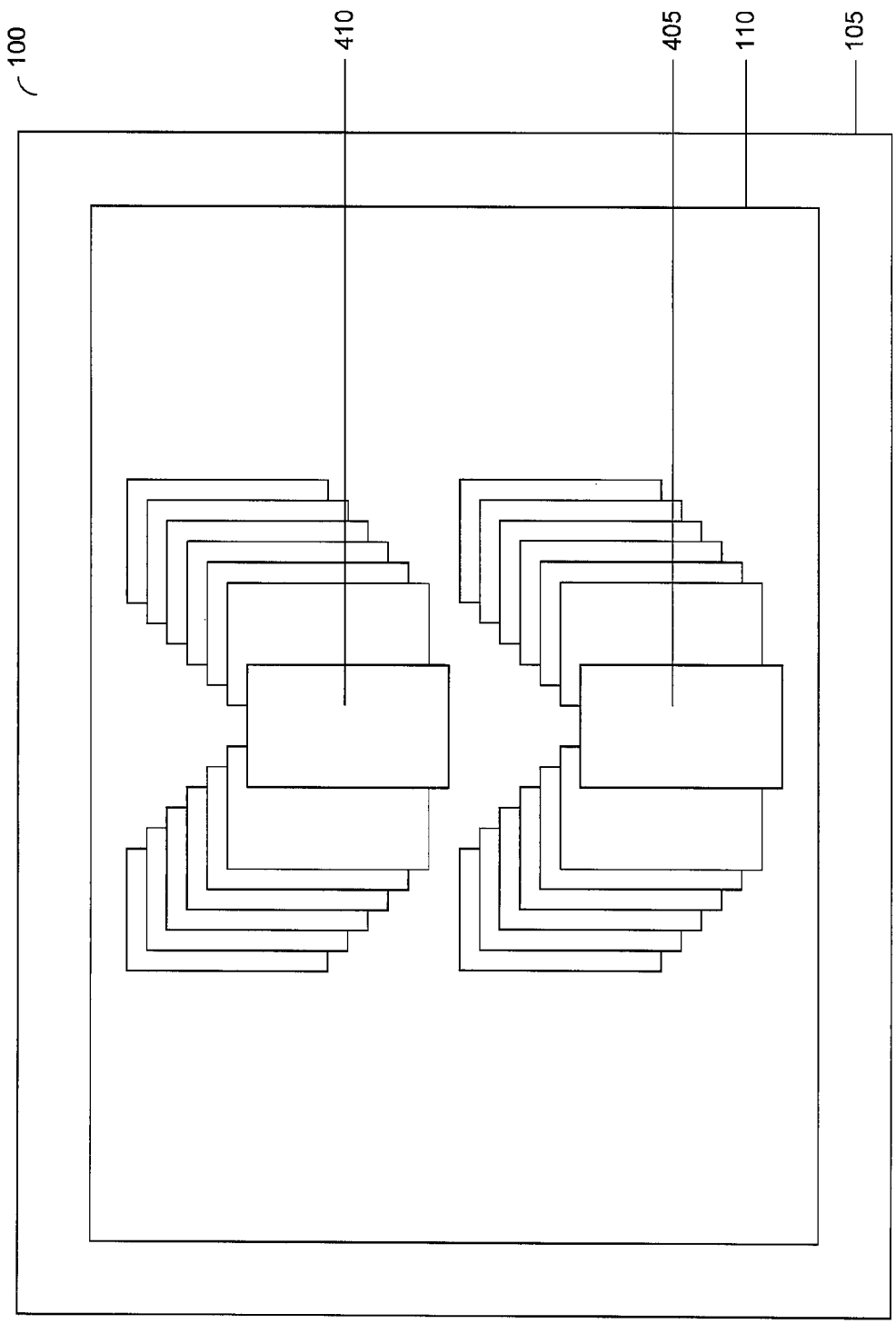
FIG. 4 is a schematic of an example of a user interface displaying two staggered collections of panes.

A number of implementations have been described. Nevertheless, it will be understood that various modifications may be made without departing from the spirit and scope of the disclosure. For example, more than one collection of staggered panes can be displayed on the user interface, as depicted in FIG. 4. In a default implementation, the first collection of staggered panes 405 can be displayed. In response to user input, a second collection of staggered panes 410 can be added to the user interface. The first collection 405 can be re-positioned and re-sized automatically to accommodate the second collection 410. In some implementations, two different sequences of frames can be uploaded into each collection 405 and 410, and viewed simultaneously. The play back of one sequence of frames on the first collection 405 can be independent of the play back of the second sequence of frames on the second collection. In this manner, two sequences of frames, each sequence representing a video file, can be simultaneously viewed.

In some implementations, a user can select and drag one or more frames displayed on one or more panes into a repository where the dragged one or more frames can be stored. In some implementations, the user can add a new collection of panes to the user interface to be displayed in addition to the existing collection of panes on which a sequence of frames is displayed. The user can select and move one or more frames displayed on the existing collection of panes to the new collection of panes. A copy of the selected frames can be created and displayed in the new collection of panes. Then, the user can upload a new sequence of frames on the existing collection of panes, select and move one or more frames from the new sequence to the new collection of panes. When the user inserts frames into panes in the new collection of panes, the frames can be automatically re-positioned, e.g., moved to other panes, to accommodate the inserted panes. Subsequent to inserting frames into the new collection of panes, the user can save the frames in the new collection of panes as a new sequence. In this manner, the user can create a new sequence of frames, e.g., a new video file, from available sequences. Any number of collection of panes can be displayed on the user interface, where one or more collections can be used to represent available sequences of frames, while one or more collections can be used to represent new sequences of frames being created from the available sequences.

In some implementations, a collection of panes can include more than one current pane, where each of the current panes can be displayed in their entirety. In some implementations, the size of the future panes and the past panes can be different from, e.g., smaller than, the current pane. Further, the size of a future pane can be different from that of another future pane based on the proximity of the future pane to the current pane. For example, as the position of the future pane moves away from that of the current pane, the size of the future pane can decrease or vice versa. Similarly, the size of each past pane can be different from that of another past pane. In some implementations, the user can select a frame in any pane and move the selected frame to any other pane. Such movement can cause the remaining frames to be re-positioned in different panes in the collection in order to maintain the sequence of frames. The sequence of frames can represent any digital content, e.g., images. Each image can be displayed in a pane. Further, the sequence of frames can represent pages in a document. Each pane can display a page in the document. Any additional information, e.g., reflection of the current pane, frame numbers, metadata related to the sequence, and the like, can be included in the user interface in which the panes are displayed. Accordingly, other embodiments are within the scope of the following claims.

What is claimed is:

1. A computer-implemented method of transferring digital content, the method comprising:

displaying, by data processing apparatus, a first plurality of panes arranged in a staggered formation in a user interface, wherein a first pane of the first plurality of panes is entirely visible and adjacent panes of the first plurality of panes are partially visible and displayed adjacent to the first entirely visible pane, wherein one or more of the adjacent panes of the first plurality of panes are displayed on the user interface to the left of the first entirely visible pane and one or more of the adjacent panes of the first plurality of panes are displayed on the user interface to the right of the first entirely visible pane;

displaying, by the data processing apparatus, a digital video item that includes a plurality of frames arranged in a sequence, by displaying a frame of the plurality of frames arranged in the sequence in the first entirely visible pane and displaying adjacent frames in corresponding adjacent panes of the first plurality of panes, the plurality of frames presentable in a playback sequence;

displaying, by the data processing apparatus, a second plurality of panes adjacent the first plurality of panes, wherein the second plurality of panes are arranged in a staggered formation in the user interface, wherein a second pane of the second plurality of panes is entirely visible and adjacent panes of the second plurality of panes are partially visible and displayed adjacent to the second entirely visible pane, wherein one or more of the adjacent panes of the second plurality of panes are displayed on the user interface to the left of the second entirely visible pane and one or more of the adjacent panes of the second plurality of panes are displayed on the user interface to the right of the second entirely visible pane;

receiving input requesting to transfer a frame displayed in a selected pane of the first plurality of panes to a selected pane of the second plurality of panes; and in response to receiving the input, displaying, by the data processing apparatus, the frame displayed in the selected pane of the first plurality of frames in the selected pane of the second plurality of panes.

2. The method of claim 1, further comprising:
displaying, in the first entirely visible pane, successive frames of the item of digital content by sequentially replacing the frame in the first entirely visible pane with an adjacent frame; and displaying the frame in the successive frames that was replaced by a next frame in an adjacent pane of the first plurality of panes displayed on the right of the first entirely visible pane, in response to the input, wherein sequentially replacing the frame in the first entirely visible pane with an adjacent frame causes the replaced frame to be displayed in a partially visible adjacent pane.

3. The method of claim 2, wherein the sequentially replacing can be stopped or started based on user input.

4. The method of claim 2, wherein displaying the replaced frame in a partially visible adjacent pane to the right of the first entirely visible pane corresponds to displaying the item of digital content in a forward direction.

5. The method of claim 4, wherein the direction in which the item of digital content is displayed can be altered based on user input.

6. The method of claim 1, wherein the pane is rectangular.

7. The method of claim 1, wherein a top edge and a left edge of each of the one or more of the adjacent panes displayed to the left of the first entirely visible pane are visible.

8. The method of claim 1, wherein a top edge and a right edge of each of the one or more of the adjacent panes displayed to the right of the first entirely visible pane are visible.

9. The method of claim 1, further comprising, in response to receiving the input, creating a copy of the frame displayed in the selected pane of the first plurality of panes.

10. The method of claim 1, further comprising:
displaying another digital video item that includes another plurality of frames by displaying a frame of the other plurality of frames in the first entirely visible pane, in place of the frame of the plurality of frames, and displaying other frames of the other plurality of frames in corresponding adjacent panes, in place of the adjacent frames of the plurality of frames;

receiving input requesting to transfer a frame of the other plurality of frames displayed in a pane of the first plurality of panes to another selected pane of the second plurality of panes; and in response to receiving the input, transferring the frame of the other plurality of frames to the other selected pane of the second plurality of panes, wherein the second plurality of panes displays the frame of the plurality of frames and the other frame of the other plurality of frames.

11. The method of claim 10, further comprising:
receiving input requesting to save the frame of the plurality of frames and the other frame of the other plurality of frames displayed in the second plurality of panes as another digital video item; and in response to receiving the input, saving the frame of the plurality of frames and the other frame of the other plurality of frames displayed in the second plurality of panes as the other digital video item.

12. The method of claim 1, further comprising:
detecting a selection of a frame displayed in an adjacent pane in the plurality of panes, wherein the adjacent frame is partially visible;

receiving input to move the selected frame displayed in the partially visible adjacent pane; and in response to receiving the input to move the selected frame:
displaying a new entirely visible pane that is separate from the first entirely visible pane, and
displaying the selected frame in the new entirely visible pane.

13. A method comprising:
displaying, by a data processing apparatus, a plurality of panes arranged in a staggered formation in a user interface, wherein at least one pane of the plurality of panes is entirely visible and adjacent panes are partially visible and displayed adjacent to the at least one entirely visible pane;

displaying, by the data processing apparatus, a frame of an item of digital content comprising a sequence of frames in an entirely visible pane and displaying adjacent frames in corresponding adjacent panes;

displaying, by the data processing apparatus, in the entirely visible pane successive frames of the item of digital content by sequentially replacing the frame in the entirely visible pane with an adjacent frame;

displaying, by the data processing apparatus, a second plurality of panes adjacent to the plurality of panes, the second plurality of panes arranged in a staggered formation on the user interface, wherein a pane of the second plurality of panes is entirely visible and remaining panes of the second plurality of panes, displayed adjacent to the first pane, are partially visible;

selecting, by the data processing apparatus, a frame displayed in a pane in the plurality of panes; and moving, by the data processing apparatus, the selected frame to a pane in the second plurality of panes.

14. A computer-readable medium tangibly encoding instructions executable by one or more computers to perform operations comprising:

displaying a first plurality of panes arranged in a staggered formation in a user interface, wherein a first pane of the first plurality of panes is entirely visible and adjacent panes of the first plurality of panes are partially visible and displayed adjacent to the first entirely visible pane, wherein one or more of the adjacent panes of the first plurality of panes are displayed on the user interface to the left of the first entirely visible pane and one or more of the adjacent panes of the first plurality of panes are displayed on the user interface to the right of the first entirely visible pane;

displaying a digital video item that includes a plurality of frames arranged in a sequence, by displaying a frame of the plurality of frames arranged in the sequence in the first entirely visible pane and displaying adjacent frames in corresponding adjacent panes of the first plurality of panes, the plurality of frames presentable in a playback sequence;

displaying a second plurality of panes adjacent the first plurality of panes, wherein the second plurality of panes are arranged in a staggered formation in the user interface, wherein a second pane of the second plurality of panes is entirely visible and adjacent panes of the second plurality of panes are partially visible and displayed adjacent to the second entirely visible pane, wherein one or more of the adjacent panes of the second plurality of panes are displayed on the user interface to the left of the second entirely visible pane and one or more of the adjacent panes of the second plurality of panes are displayed on the user interface to the right of the second entirely visible pane;

receiving input requesting to transfer a frame displayed in a selected pane of the first plurality of panes to a selected pane of the second plurality of panes; and in response to receiving the input, displaying the frame displayed in the selected pane of the first plurality of frames in the selected pane of the second plurality of panes.

15. The medium of claim 14, the operations further comprising:

displaying in the first entirely visible pane successive frames of the item of digital content by sequentially replacing the frame in the first entirely visible pane with an adjacent frame; and displaying the frame in the successive frames that was replaced by a next frame in an adjacent pane of the first plurality of panes displayed to the right of the first entirely visible pane, in response to the input, wherein sequentially replacing the frame in the entirely visible pane with an adjacent frame causes the replaced frame to be displayed in a partially visible adjacent pane.

16. The medium of claim 15, wherein the sequentially replacing can be stopped or started based on user input.

17. The medium of claim 15, wherein displaying the replaced frame in a partially visible adjacent pane to the right of the first entirely visible pane corresponds to displaying the item of digital content in a forward direction.

18. The medium of claim 17, wherein the direction in which the item of digital content is displayed can be altered based on user input.

19. The medium of claim 14, wherein the pane is rectangular.

20. The medium of claim 14, wherein a top edge and a left edge of the one or more of the adjacent panes displayed to the left of the first entirely visible pane are visible.

21. The medium of claim 14, wherein a top edge and a right edge of each of the one or more of the adjacent panes displayed to the right of the first entirely visible pane are visible.

22. The medium of claim 14, the operations further comprising, in response to receiving the input, creating a copy of the frame displayed in the selected pane of the first plurality of panes.

23. The medium of claim 22, the operations further comprising:

receiving input requesting to save the frame of the plurality of frames and the other frame of the other plurality of frames displayed in the second plurality of panes as another digital video item; and in response to receiving the input, saving the frame of the plurality of frames and the other frame of the other plurality of frames displayed in the second plurality of panes as the other digital video item.

24. The medium of claim 14, the operations further comprising:

displaying another digital video item that includes another plurality of frames by displaying a frame of the other plurality of frames in the first entirely visible pane, in place of the frame of the plurality of frames, and displaying other frames of the other plurality of frames in corresponding adjacent panes, in place of the adjacent frames of the plurality of frames;

receiving input requesting to transfer a frame of the other plurality of frames displayed in a pane of the first plurality of panes to another selected pane of the second plurality of panes; and in response to receiving the input, transferring the frame of the other plurality of frames to the other selected pane of the second plurality of panes, wherein the second plurality of panes displays the frame of the plurality of frames and the other frame of the other plurality of frames.

25. The medium of claim 14, the operations further comprising:

detecting a selection of a frame displayed in an adjacent pane in the plurality of panes, wherein the adjacent frame is partially visible;

receiving input to move the selected frame displayed in the partially visible adjacent pane; and in response to receiving the input to move the selected frame:

displaying a new entirely visible pane that is separate from the first entirely visible pane, and displaying the selected frame in the new entirely visible pane.

26. A computer-readable medium of tangibly encoding instructions executable by data processing apparatus to perform operations comprising:

displaying a plurality of panes arranged in a staggered formation in a user interface, wherein at least one pane of the plurality of panes is entirely visible and adjacent panes are partially visible and displayed adjacent to the at least one entirely visible pane;

displaying a frame of an item of digital content comprising a sequence of frames in an entirely visible pane and displaying adjacent frames in corresponding adjacent panes;

displaying in the entirely visible pane successive frames of the item of digital content by sequentially replacing the frame in the entirely visible pane with an adjacent frame;

displaying a second plurality of adjacent to the plurality of panes, the second plurality of panes arranged in a staggered formation on the user interface, wherein a pane of the second plurality of panes is entirely visible and remaining panes of the second plurality of panes, displayed adjacent to the first pane, are partially visible;

selecting a frame displayed in a pane in the plurality of panes; and moving the selected frame to a pane in the second plurality of panes.

27. A computer-implemented method for transferring digital content, the method comprising:

displaying, by data processing apparatus, a first plurality of panes arranged in a staggered formation in a user interface, wherein a first pane of the first plurality of panes is entirely visible and adjacent panes of the first plurality of panes are partially visible and displayed adjacent to the first entirely visible pane;

displaying, by the data processing apparatus, a digital video item that includes a plurality of frames, in the first plurality of panes, by displaying frames of the digital video item in corresponding panes of the first plurality of panes;

displaying, by the data processing apparatus, a second plurality of panes arranged in a staggered formation adjacent to the first plurality of panes in the user interface, wherein a second pane of the second plurality of panes is entirely visible and adjacent panes of the second plurality of panes are partially visible and displayed adjacent to the second entirely visible pane;

receiving, by the data processing apparatus, input requesting to transfer a frame of the digital video item that is displayed in a corresponding pane of the first plurality of panes to the second plurality of panes; and in response to receiving the request, transferring, by the data processing apparatus, the frame of the digital video item to a pane of the second plurality of panes.

28. The method of claim 27, wherein receiving the input requesting to transfer the frame of the digital video item comprises:

detecting a selection of the pane of the first plurality of panes in which the frame of the digital video item to be transferred, is displayed; and detecting a movement of the selected pane from the first plurality of panes to the second plurality of panes.

29. The method of claim 27, wherein transferring the frame of the digital video item to the pane of the second plurality of panes comprises:

creating a copy of the frame to be transferred; and displaying the copy of the frame in the pane of the second plurality of panes.

30. The method of claim 27, further comprising:

displaying a second digital video item that includes a second plurality of frames, in the first plurality of panes, in place of the plurality of frames;

receiving input requesting to transfer a frame of the second digital video item that is displayed in a corresponding pane of the first plurality of panes to the second plurality of panes; and in response to receiving the request, transferring the frame of the second digital video item to another pane of the second plurality of panes, wherein the second plurality of panes displays the frame of the digital video item and the frame of the second digital video item.

31. The method of claim 30, further comprising, storing the frame of the digital video item and the frame of the second digital video item, that are displayed in the second plurality of panes, as a new digital video item.

\* \* \* \* \*

UNITED STATES PATENT AND TRADEMARK OFFICE
CERTIFICATE OF CORRECTION

| | | |
|---|---|---|
| PATENT NO. | : 8,006,185 B2 | Page 1 of 1 |
| APPLICATION NO. | : 11/760719 | |
| DATED | : August 23, 2011 | |
| INVENTOR(S) | : Marinkovich et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 488 days.

Signed and Sealed this

Thirteenth Day of March, 2012

David J. Kappos
*Director of the United States Patent and Trademark Office*